Figure 1:
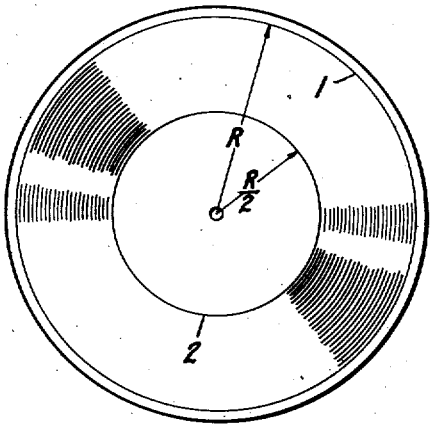

Oct. 20, 1931.

J. P. MAXFIELD

SOUND RECORDING METHOD

Re. 18,228

Original Filed Jan. 17, 1925

Inventor:
Joseph P. Maxfield by E. W. Adams Att'y.

Reissued Oct. 20, 1931

Re. 18,228

UNITED STATES PATENT OFFICE

JOSEPH P. MAXFIELD, OF MAPLEWOOD, NEW JERSEY, ASSIGNOR, BY MESNE ASSIGNMENTS, TO WESTERN ELECTRIC COMPANY, INCORPORATED, A CORPORATION OF NEW YORK

SOUND RECORDING METHOD

Original No. 1,637,082, dated July 26, 1927, Serial No. 2,971, filed January 17, 1925. Application for reissue filed April 4, 1931. Serial No. 527,781.

This invention relates to sound recording and particularly to methods of producing phonograph sound records of the rotatable disc type.

An object of the invention is a method for producing phonograph sound records which will give a greatly increased duration of effective run for a given size of record.

As is well known, the existing methods for producing sound records usually include as one step in the operation the use of a cutting tool or stylus for cutting a groove in a suitable moving surface, this cutting tool or stylus by mechanical connection to a diaphragm or by other means being adapted to vibrate either vertically or horizontally in accordance with sound waves representing the sounds to be recorded, thus producing in the groove undulations corresponding to the sound variations.

This invention has special application to phonograph records of the rotatable disc type in which sound variations are recorded on the surface over a region extending from the circumference to a region nearer the center of the record. The applicant has discovered that there is a definite relation existing between the time such a record will run, the speed of rotation of the record, its diameter, and the particular portion of the surface of the record utilized for recording purposes, such that by properly selecting these latter elements it is possible to increase the effective duration of run for a given size of record greatly beyond that obtainable in records produced by methods of the prior art. This is especially important in connection with the so-called "talking" motion pictures and the recording of long symphony orchestra programs where it is desirable to employ phonograph sound records which will run a considerably longer time than records of the prior art. This result was arrived at by the following mathematical analysis:

The length of time for which a given record will run depends upon the following factors:

(1) The outside diameter of the record.

(2) The slowest linear speed at which sounds can be recorded successfully.

(3) The number of threads or grooves cut per inch of radius.

(4) The angular velocity at which the record disc is rotated.

The slowest linear speed at which sounds can be recorded successfully depends upon the highest frequency to be recorded and the diameter of the needle which is to reproduce these sounds. It has been found experimentally that with records recording all sounds up to frequencies of 6,000 vibrations per second and which are to be reproduced with the present commercial steel needles, the lowest value of linear speed is of the order of 15″ per second.

The relationship existing between the above four factors can best be shown by the following equations:

Let R = the radius of the outside of the recording cut on the disc in inches.

$r$ = the radius of the inside of the recording cut on the disc in inches.

N = the number of threads or grooves cut per inch of radius.

$V_o$ = the minimum linear speed in inches per second at which successful sound recording can be effected.

$s$ = the angular velocity of rotation of the disc in radians per second.

$t$ = the duration of run of the record in seconds.

$t_m$ = the maximum duration of run for a record of given size in seconds.

$s_m$ = the angular velocity of the record corresponding to the time of run $t_m$.

T = the duration of run of the record in minutes.

$T_m$ = the maximum duration of run for a record of given size in minutes.

S = the speed of rotation of the disc in revolutions per minute.

$S_m$ = the speed of rotation of the disc in revolutions per minute corresponding to the time of run $T_m$.

A = total angle through which the disc will rotate in the time $t$.

Since the minimum velocity occurs at the inside of the record, that is, where the radius equals $r$, $$V_o = sr \quad (1)$$

The total number of revolutions which the record will make is equal to $(R-r)N$ and, therefore, the total angle through which the record rotates will be represented by $$A = 2\pi N\ (R-r) \quad (2)$$

Also $$A = st = 2\pi N\ (R-r) \quad (3)$$

Substituting the value of $s$ from equation (1) in equation (3) and solving, a value for $t$ is obtained:

$$t = \frac{2\pi Nr}{V_o}(R-r) \quad (4)$$

Similarly, substituting the value of $r$ from equation (1) in equation (3) and solving, the following value for $t$ is obtained:

$$t = \frac{2\pi N}{s}\left(R - \frac{V_o}{s}\right) \quad (5)$$

Solving equation (5) for a maximum value of $t$, it is found that $t$ is a maximum when the angular velocity is given by:

$$s_m = \frac{2V_o}{R} \quad (6)$$

Substituting this value of $s_m$ for $s$ in equation (1), it is found that when $t$ is a maximum, $$r = \frac{R}{2} \quad (7)$$

Substituting the value of $s_m$ of equation (6) for $s$ in equation (5) or the value of $r$ of equation (7) in equation (4) a maximum value for $t$ is obtained.

$$t_m = \frac{\pi NR^2}{2V_o} \quad (8)$$

Eliminating R from equations (6) and (8), the following equation is obtained:

$$t_m s_m^2 = 2\pi NV_o = \text{a constant} \quad (9)$$

For the sake of simplicity, equations (5), (6), (8) and (9) may be rewritten expressing angular velocity in revolutions per minute instead of radians per second and time in minutes instead of seconds. They then become:

$$T = \frac{N}{S}\left(R - \frac{30V_o}{\pi S}\right) \quad (10)$$

$$S_m = \frac{60V_o}{\pi R} \quad (11)$$

$$T_m = \frac{\pi NR^2}{120V_o} \quad (12)$$

$$T_m S_m^2 = \frac{30NV_o}{\pi} \quad (13)$$

The above analysis applies to both the lateral and vertical type of cut.

From the above mathematical analysis, it is apparent that the maximum duration of effective run for a given sized record will be obtained if the portion of the surface of the record used for recording purposes is so selected that the distance of the inside of the recording cut is substantially one half that of the outside of the recording cut from the center of the record, and if the speed of recording in revolutions per minute is made substantially equal to 60 times the minimum linear speed in inches per second at which successful sound recording can be effected in the given record material divided by $\pi$ times the distance in inches of the outside of the recording cut from the center of the record.

Figure 2:
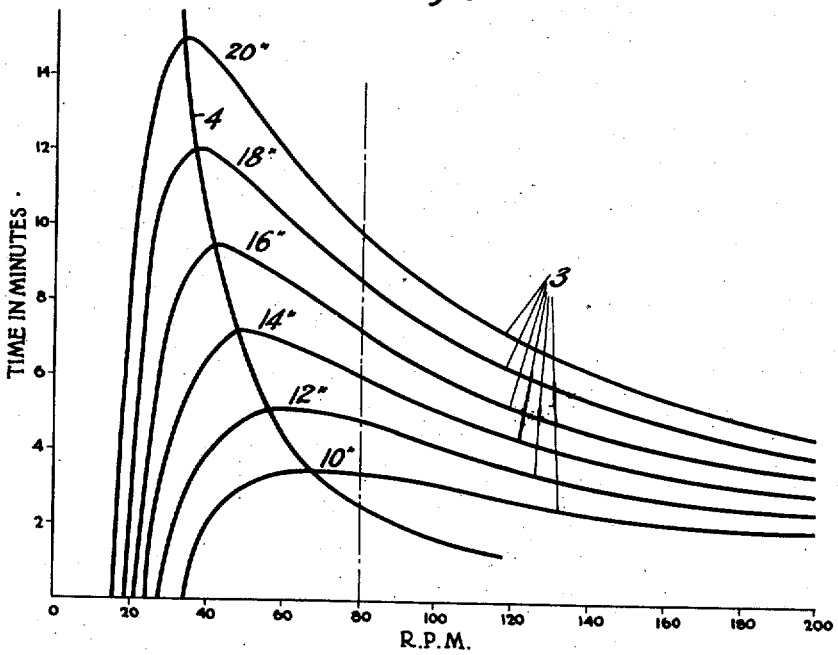

The objects of the invention will be clear from the following detailed description read in connection with the accompanying drawings in which Fig. 1 illustrates the location of the recording cut as embodied in the invention on the surface of a phonograph record of the disc rotatable type, and Fig. 2 shows a series of curves giving the relation between recording speed and duration of effective run for disc phonograph records of various diameters.

Referring to the drawings, in Fig. 1 is shown schematically in a record of the disc rotatable type the relative distances from the center of the disc of the outside 1 and the inside 2 of the recording cut, as embodied in the invention. As shown in the drawings, the radius of the inside 2 of the recording cut is equal to one-half of the radius R of the outside 1 of the recording cut.

Referring to Fig. 2, a series of curves 3 ie shown giving the relation between the speed of recording in revolutions per minute and the duration of run in minutes for records of various diameter ranging from a diameter of 10 inches to a diameter of 20 inches. These curves were plotted in accordance with equation (10), $$T = \frac{N}{S}\left(R - \frac{30V_o}{\pi S}\right),$$

derived above. In accordance with standard phonograph practice, the constants used are the following:

$N$ = 100 grooves per inch
$V_o$ = 16.7 inches per second
$R = \dfrac{\text{diameter} - 3/8 \text{ inches.}}{2}$ Referring to the curves 3, it should be noted that when the speed is higher than that corresponding to $T_m$, a smaller portion of the record is cut at speeds approaching the minimum allowable. Therefore, it is apparent that if the speed of recording to be used is not that corresponding exactly to the maximum time of run, it is preferable to have this speed slightly higher rather than lower than the proper one.

In Fig. 2, a curve 4 joining the maxima of the time curves 3 is also shown, this curve corresponding to equation (13)

$$T_m S_m^2 = \frac{30NV_o}{\pi}$$

derived above. Referring to this curve, it should be noted that the upper part of the curve is very steep showing that for records of large diameters, an average recording speed can be selected for several records of different diameters, which value of speed will give a time of run for each record close enough to the maximum time of run for all practical purposes. For instance, records 16 inches in diameter and greater cut at a speed of 40 R. P. M., a value just about one-half of the standard phonograph speed of the prior art, indicated by the dotted line in Fig. 2, will have a greatly increased duration of run over records cut in accordance with the standard practice of the prior art. From the curves 3, it will be noted that for a record 16 inches in diameter, the gain in duration of run resulting from operating at a speed of 40 R. P. M. instead of 80 R. P. M. will be 2.3 minutes out of 7.2 minutes standard run, or 32 percent, for a record 18 inches in diameter 3.5 minutes out of 8.5 minutes standard run, or 41 per cent, and for a record 20 inches in diameter 4.9 minutes out of 9.7 minutes standard run, or 50 per cent. A record having a sound circle 16.2 inches in diameter, having its recording range limited in accordance with the invention and cut and operated at a speed of approximately 40 R. P. M. with 112 threads per inch would have an effective duration of run sufficiently long to accompany 1,000 feet of motion picture film, assuming the film to run at a rate of 20 pictures per second. On the other hand, a record cut in accordance with standard practice of the prior art and operated at standard phonograph speed would have to have a sound circle whose diameter is 24.9 inches in order to do this.

Referring to equation (11) above, it will be noted that $S_m$, the angular speed of rotation corresponding to the maximum duration of run, is directly proportional to $V_o$, the minimum linear speed at which successful sound recording can be effected. As stated above, manufacturing conditions at the present time limit $V_o$ to about 16.7 inches per second and the curves of Fig. 2 have been plotted using that value, but it is to be understood that it is not desired to set any limitations to the particular minimum linear speed that may be used in practice.

It will be evident from the curves of Fig. 2 that for the values of groove spacing and minimum recording velocity upon which the curves are based the actual time gain obtained by recording in accordance with this invention varies greatly with the size of the record used, being very appreciable for large sized records and decreasing as the size of the record is reduced, until for very small records the time gain becomes almost negligible.

It should be noted, however, that even for small sized records the time of play at the optimum speed may be much greater than that at other speeds if closer groove spacing or lower minimum recording velocity is used. In other words, for closer groove spacing and for lower values of minimum recording velocity (which are permissible, for example, when only a comparatively narrow band of frequencies is to be recorded) the curves for the smaller records become of the same general shape as those for the larger records shown in the drawings. This will be clear from an inspection of equations (10) and (12) representing the time of play at any given speed S and the time of play at optimum speed $S_m$.

For purposes of illustration assume two 8″ records having $$V_o = 16.35'' \text{ and } 7''$$
$$N = 100 \text{ and } 150$$
$$\text{and } S_m = 78 \text{ and } 33.5$$

respectively, and consider the difference in playing time (K) in each case when the records are played at optimum speed $S_m$ and twice optimum speed $2S_m$. This latter value is chosen arbitrarily merely for the purpose of giving a measure of the increase in playing time obtained. For the first record:

$$T_m = 2.56;\ T_{2m} = 1.92;\ K = .64$$

For the second record:

$$T_m = 9.0;\ T_{2m} = 6.7;\ K = 2.3$$

Hence the utility of the invention is not necessarily confined to any particular sizes of record but is dependent upon the particular combination of constants that it is desired to use in any given case. If it be assumed, for instance, that a one minute difference in playing time for records played at speeds $S_m$ and $2S_m$ is the minimum of interest, then $$T_m - T_{2m} \geqq 1,$$

that is:

$$\frac{\pi N R^2}{120 V_o} - \frac{N}{2S}\left(R - \frac{30 V_o}{2\pi S}\right) \geqq 1.0 \quad (14)$$

but $$S_m = \frac{60 V_o}{\pi R}$$

so that $$R^2\left(\frac{\pi N}{480 V_o}\right) \geqq 1.0 \quad (15)$$

That is to say, assuming that the minimum gain in playing time in accordance with equation (14) which is of interest, is one minute, the invention is applicable not only to all ordinary records of more than a given diameter but rather to all records in which the following requirements are met:

1. The recording speed in R. P. M. is substantially equal to $$\frac{60V_o}{\pi R}.$$

2. $r$ is substantially equal to $\frac{R}{2}$, and

3. The groove spacing, the record diameter and the minimum velocity are so proportioned that $$\frac{R^2N}{480V_o} \geq 1$$

By the term "effective duration of run" as used in the specification and claims is meant the interval of time during which the recorded sounds can be reproduced.

Although the method of inscribing sound records in accordance with the invention has been described above as applied directly to the permanent sound records themselves, it is to be understood, of course, that the invention is also applicable to master sound records and to all permanent sound records made from such master records by stamping or other well known processes.

What is claimed is:

1. A method of increasing the time of effective run of a phonograph record which comprises cutting the sound variations into a record blank at a speed in revolutions per minute substantially equal to 60 times the minimum linear speed at which successful sound recording can be effected in a given recording material divided by $\pi$ times the radius in inches of the outside of the recording cut from the center of the record, the radius of the inside recording cut being limited thereby to substantially one-half the radius of the outside recording cut.

2. A sound record comprising a surface capable of receiving an impression and a groove on said surface, said groove having an undulatory contour corresponding to sound variations, said groove being in a spiral having an inner radius substantially one-half the outer radius, said undulatory contour of said groove being of such character as would be produced at such a constant speed of rotation of said surface that the linear speed at said inner radius is the minimum at which successful sound recording can be done in said surface.

3. A sound record comprising a surface capable of receiving an impression and a groove in said surface, said groove having undulations corresponding to sound variations, and of such character that the normal sounds are reproduced at a record speed in revolutions per minute of 60 times the minimum linear speed in inches per second at which said sound variations can be effectively recorded in said surface divided by $\pi$ times the greatest distance in inches of said groove from the center of said surface.

4. A sound record comprising a surface capable of receiving an impression and a groove in said surface, said groove having undulations corresponding to sound variations, said groove being included in a ring having an inner radius and an outer radius, said inner radius being substantially one-half the outer radius, said undulations being of such character that the normal sounds are reproduced at a record speed in revolutions per minute substantially equal to 60 times the minimum linear speed at which sounds can be efficiently recorded in said surface, divided by $\pi$ times the length in inches of said outer radius of said ring.

5. A disc sound record having sound undulations recorded thereon in a spiral line extending between two points on the surface situated at radial distances from the center in the proportion of substantially two to one, and adapted for normal reproduction of the recorded sounds when rotated at a rate such that the linear velocity at the inside point is of about 14 to 17 inches per second at the inner end of the spiral.

6. A disc sound record having a sound circle of maximum diameter at least as small as 16½ inches and having recorded therein the sounds accompanying the action recorded upon 1,000 feet of standard motion picture film.

7. A sound record comprising a surface capable of receiving an impression and a groove in said surface, said groove having an undulatory contour corresponding to sound variations, said groove being in a spiral having an inner radius substantially one-half the outer radius, said undulatory contour of said groove being of such character that the normal sounds are reproduced at a record speed in revolutions per minute substantially 60 times the minimum linear speed in inches per second at which sound variations can be effectively recorded in said surface divided by $\pi$ times the length in inches of said outer radius of said spiral, said outer radius being such that the effective sound-producing time of run of said record will be substantially equal to that of 1,000 feet of motion picture film moving at the normal rate of speed.

8. A sound record comprising a surface capable of receiving an impression and a groove in said surface having an undulatory contour corresponding to sound variations, said groove being in a spiral having an inner radius substantially one-half of the outer radius of said spiral from the center of said surface, said undulatory contour being of such character that the normal sounds are reproduced at a record speed of substantially 36 to 40 revolutions per minute, said outer radius of said spiral being of such length that the effective time of run of said record will be substantially equal to the time of run of 1,000 feet of motion picture film operated at a speed of twenty pictures per second.

9. A sound record comprising a surface at least 9″ in diameter capable of receiving an impression and a groove on the surface, the groove having an undulatory contour corresponding to sound variations and being disposed in a spiral having an inner radius substantially one-half the outer radius, the undulatory contour of the groove being of such a character as would be produced at such a constant speed of rotation of the surface that the linear speed at the inner radius is the minimum at which successful sound recording can be done in the surface.

10. The method of increasing the time of effective run of phonograph records in which the constants are such that the product of $\pi$, the square of the outer radius and the groove spacing, divided by 480 times the minimum recording velocity is not less than unity, which comprises cutting the sound variations into a record blank at a speed in revolutions per minute substantially equal to 60 times the minimum linear speed at which successful reproduction can be effected from a given material divided by $\pi$ times the radius in inches of the outside of the recording cut, the radius of the inside recording cut being limited thereby to substantially one-half the radius of the outside recording cut.

11. A sound record comprising a surface capable of receiving an impression and a groove in the surface, the groove having undulations corresponding to sound variations and being included in a ring having an inner radius and an outer radius, the inner radius being substantially one-half the outer radius, the undulations being of such a character that the normal sounds are reproduced at a record speed in R. P. M. substantially equal to 60 times the minimum linear speed at which the sounds can be efficiently recorded in the surface, divided by $\pi$ times the length in inches of the outer radius of the ring, the spacing of the grooves and the minimum velocity being so proportioned that the product of $\pi$, the outer radius squared and the groove spacing, divided by 480 times the minimum velocity shall not be less than unity.

12. A sound record comprising a surface less than 7″ in diameter capable of receiving an impression and a groove on the surface, the groove having an undulatory contour corresponding to sound variations and being disposed in a spiral having an inner radius substantially one-half the outer radius, the undulatory contour of the groove being of such a character as would be produced at such a constant speed of rotation of the surface that the linear speed at the inner radius is the minimum at which successful sound recording can be done in the surface.

In witness whereof, I hereunto subscribe my name this 26th day of March, 1931.

JOSEPH P. MAXFIELD.